United States Patent
Tomizawa (10) Patent No.: US 7,372,861 B2
(45) Date of Patent: May 13, 2008

(54) ACCESS CONTROL APPARATUS AND ACCESS CONTROL METHOD

(75) Inventor: Hitoshi Tomizawa, Tokyo (JP)

(73) Assignee: NEC Corporation, Tokyo (JP)

( * ) Notice: Subject to any disclaimer, the term of this patent is extended or adjusted under 35 U.S.C. 154(b) by 769 days.

(21) Appl. No.: 10/839,230

(22) Filed: May 6, 2004

(65) Prior Publication Data

US 2005/0021717 A1    Jan. 27, 2005

(30) Foreign Application Priority Data

May 8, 2003   (JP) .............................. 2003/130442

(51) Int. Cl.
*H04L 12/28* (2006.01)
(52) U.S. Cl. ...................... 370/401; 709/223
(58) Field of Classification Search ................ 370/401, 370/410, 468, 389, 400, 431, 462, 463, 252, 370/253; 709/223–226
See application file for complete search history.

(56) References Cited

U.S. PATENT DOCUMENTS 5,812,819 A * 9/1998 Rodwin et al. ............... 703/23
6,009,103 A * 12/1999 Woundy ...................... 370/401
7,016,353 B2 * 3/2006 Proctor et al. ............... 370/392
2003/0147421 A1* 8/2003 Gutknecht et al. .......... 370/468

FOREIGN PATENT DOCUMENTS

JP      2002-374280      12/2002
WO      WO 99/33211      7/1999

* cited by examiner

*Primary Examiner*—Ricky Q. Ngo
*Assistant Examiner*—Gary Mui
(74) *Attorney, Agent, or Firm*—Whitham Curtis Christofferson & Cook, PC (57) ABSTRACT

An access control apparatus and method limits, to a finite time length, connection of a user terminal to a public network. The user terminal is disconnected from the public network when the use time of the logical address assigned to the user terminal reaches the time limit set for the logical address. The apparatus and method utilizes IDs issued to multiple users and IDs for multiple user terminals, and enables limiting connection to a public network from a user terminal that is connected by a leased circuit.

6 Claims, 9 Drawing Sheets

Fig. 2

Fig. 4A
STATE a

ADDRESS DISTRIBUTION TABLE

| ADDRESS | USE STATUS | USE TIME |
|---|---|---|
| A | UNUSED | 0 |
| B | UNUSED | 0 |
| C | UNUSED | 0 |

Fig. 4B
STATE b

ADDRESS DISTRIBUTION TABLE

| ADDRESS | USE STATUS | USE TIME |
|---|---|---|
| A | USED | 0 |
| B | UNUSED | 0 |
| C | UNUSED | 0 |

Fig. 4C
STATE c

VALID ID TABLE

| VALID ID | USE STATUS |
|---|---|
| 1 | USED |
| 2 | - |
| 3 | - |

ADDRESS DISTRIBUTION TABLE

| ADDRESS | USE STATUS | USE TIME |
|---|---|---|
| A | USED | N |
| B | UNUSED | 0 |
| C | UNUSED | 0 |

Fig. 5A

| | LOGICAL ADDRESS | - |
|---|---|---|
| STATE A | TERMINAL UNIQUE ADDRESS | F |

Fig. 5B

| | LOGICAL ADDRESS | A |
|---|---|---|
| STATE B | TERMINAL UNIQUE ADDRESS | F |

ADDRESS DISTRIBUTION TABLE

STATE a

| ADDRESS | USE STATUS | USE TIME |
|---|---|---|
| A | UNUSED | 0 |
| B | UNUSED | 0 |
| C | UNUSED | 0 |

Fig. 9B

ADDRESS DISTRIBUTION TABLE

STATE b

| ADDRESS | USE STATUS | USE TIME | TERMINAL UNIQUE ADDRESS |
|---|---|---|---|
| A | USED | 0 | F |
| B | UNUSED | 0 | - |
| C | UNUSED | 0 | - |

ACCESS CONTROL APPARATUS AND ACCESS CONTROL METHOD

BACKGROUND OF THE INVENTION

1. Field of the Invention

The present invention relates to an access control apparatus and access control method for connecting unspecified user terminals to a public network via a leased circuit installed by a service provider and, more particularly, to an access control apparatus and access control method which set a time limit for access to a public network.

2. Description of the Prior Art

An access control apparatus has conventionally been utilized to connect unspecified user terminals to a public network via a leased circuit installed by a service provider. The access control apparatus assigns an address to a user terminal and grants an address-assigned user terminal access to a public network.

The access control apparatus controls the number of user terminals who are permitted to access a public network by limiting the number of addresses to be assigned to user terminals or setting an expiration date for use for an address to be assigned.

When the number of addresses to be assigned to user terminals is limited, a user terminal can keep accessing a public network without any time limit on the user terminal which has acquired an address once.

When a time limit is set for an address to be assigned, another address is reacquired after an expiration date for use of the address. The same user terminal can access a public network without any time limit.

If a specific user keeps accessing a public network by using a specific user terminal, another user cannot use this user terminal or cannot access a public network even with another user terminal.

A conventional technique of assigning an address to a terminal apparatus is "Address Assignment Apparatus and Method, Address Assignment Program, and Storage Medium Which Stores Address Assignment Program" disclosed in Japanese Patent Application No. 2002-374280 (patent reference 1). According to the invention disclosed in patent reference 1, a network address is assigned on the basis of attribute information acquired from a user terminal by an address assignment apparatus.

The invention disclosed in patent reference 1 aims to assign different addresses to user terminals on the basis of attribute information and permit connection in a form corresponding to an assigned address. The invention does not try to prevent continuous connection of a user terminal to a network.

There have not been proposed any access limitation apparatus and access control method which temporarily limit connection to a public network from a user terminal which is connected to the public network via a leased circuit.

SUMMARY OF THE INVENTION

The present invention has been made to overcome the conventional drawbacks, and has as its object to provide an access control apparatus and access control method which limit, to a finite time length, connection of each user terminal to a public network.

To achieve the above object, according to the first aspect of the present invention, there is provided an access control apparatus which controls connection to a public network from a plurality of user terminals manipulated by unspecified users, comprising a section which issues IDs for specifying users to users of the user terminals, a section which, upon reception of a connection request from one of the user terminals, determines whether a logical address has already been assigned to the requesting user terminal, a section which assigns a logical address for which a time limit is set, to a user terminal not assigned any logical address, a section which, in response to a connection request from the user terminal assigned the logical address, requests the user terminal serving as a transmission source of the connection request to transmit the ID, a section which determines, on the basis of the ID acquired from the user terminal serving as the transmission source of the connection request, a user and a used user terminal by which the connection request to the public network has been transmitted, a section which connects the user terminal to the public network when a use time of the logical address assigned to the user terminal serving as the transmission source of the connection request falls within the time limit set for the logical address, and a section which disconnects the user terminal from the public network when the use time of the logical address assigned to the user terminal connected to the public network reaches the time limit set for the logical address.

In the first aspect, the ID issued to a user of the user terminal and the address assigned to the user terminal are preferably managed in separate tables, and the user and the used user terminal by which the connection request to the public network has been transmitted are preferably determined on the basis of the ID acquired from the user terminal serving as the transmission source of the connection request and the address assigned to the user terminal.

To achieve the above object, according to the second aspect of the present invention, there is provided an access control apparatus which controls connection to a public network from a plurality of user terminals manipulated by unspecified users, comprising a section which, upon reception of a connection request from one of the user terminals, determines whether a logical address has already been assigned to the requesting user terminal, a section which assigns a logical address for which a time limit is set, to a user terminal not assigned any logical address, a section which acquires a physical address from the user terminal assigned the logical address, a section which associates the logical address of the user terminal serving as a transmission source of the connection request with information representing use times of the physical address and the logical address of the user terminal, a section which connects the user terminal to the public network when the use time of the logical address assigned to the user terminal serving as the transmission source of the connection request falls within the time limit set for the logical address, and a section which disconnects the user terminal from the public network when the use time of the logical address assigned to the user terminal connected to the public network reaches the time limit set for the logical address.

In the second aspect, the logical address assigned to the user terminal serving as the transmission source of the connection request and the physical address of the user terminal are preferably managed in the same table.

To achieve the above object, according to the third aspect of the present invention, there is provided an access control method of controlling connection to a public network from a plurality of user terminals manipulated by unspecified users, comprising the steps of issuing IDs for specifying users to users of the user terminals, determining, upon reception of a connection request from one of the user terminals, whether a logical address has already been assigned to the requesting user terminal, assigning a logical address for which a time limit is set, to a user terminal not assigned any logical address, requesting, in response to a connection request from the user terminal assigned the logical address, the user terminal serving as a transmission source of the connection request to transmit the ID, determining, on the basis of the ID acquired from the user terminal serving as the transmission source of the connection request, a user and a used user terminal by which the connection request to the public network has been transmitted, connecting the user terminal to the public network when a use time of the logical address assigned to the user terminal serving as the transmission source of the connection request falls within the time limit set for the logical address, and disconnecting the user terminal from the public network when the use time of the logical address assigned to the user terminal connected to the public network reaches the time limit set for the logical address.

To achieve the above object, according to the fourth aspect of the present invention, there is provided an access control method of controlling connection to a public network from a plurality of user terminals manipulated by unspecified users, comprising the steps of determining, upon reception of a connection request from one of the user terminals, whether a logical address has already been assigned to the requesting user terminal, assigning a logical address for which a time limit is set, to a user terminal not assigned any logical address, acquiring a physical address from the user terminal assigned the logical address, associating the logical address of the user terminal serving as a transmission source of the connection request with information representing use times of the physical address and the logical address of the user terminal, connecting the user terminal to the public network when the use time of the logical address assigned to the user terminal serving as the transmission source of the connection request falls within the time limit set for the logical address, and disconnecting the user terminal from the public network when the use time of the logical address assigned to the user terminal connected to the public network reaches the time limit set for the logical address.

As is apparent from the above aspects, the present invention provides an access control method and access control apparatus which limit, to a finite time length, connection of each user terminal to a public network.

The above and many other objects, features and advantages of the present invention will become manifest to those skilled in the art upon making reference to the following detailed description and accompanying drawings in which preferred embodiments incorporating the principle of the present invention are shown by way of illustrative examples.

DETAILED DESCRIPTION OF THE PREFERRED EMBODIMENTS

Several preferred embodiments of the present invention will be described below with reference to the accompanying drawings.

First Embodiment

Figure 1:
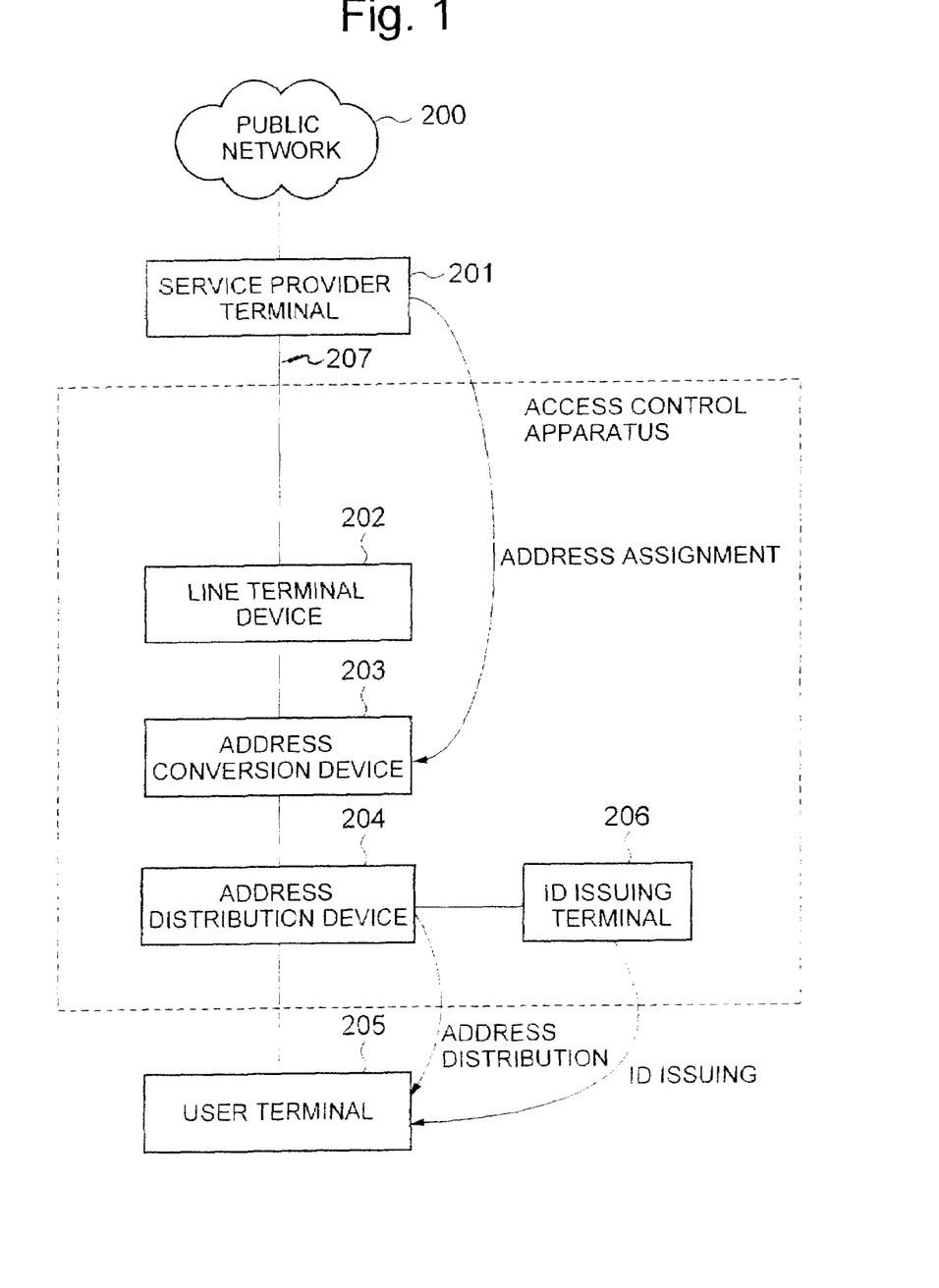
FIG. 1 is a view showing the arrangement of an access control apparatus according to the first embodiment which preferably practices the present invention.

The first embodiment which preferably practices the present invention will be explained with reference to FIGS. 1 to 5B. FIG. 1 shows an access control apparatus according to the first embodiment. The access control apparatus comprises a line terminal device 202, address conversion device 203, address distribution device 204, ID issuing terminal 206, and access line 207. A service provider terminal 201 and user terminal 205 are connected via the access control apparatus. Only the user terminal 205 is illustrated for descriptive convenience, but a plurality of user terminals exist in practice.

The service provider terminal 201 provides a service for connecting the user terminal 205 to a public network 200. The line terminal device 202 terminates the physical protocol of the access line 207 provided by the service provider, and enables logical connection between the address conversion device 203 and the public network 200. The address conversion device 203 holds a predetermined number of addresses provided in advance by the service provider terminal 201. The address conversion device 203 converts two addresses into each other: an address capable of specifying an arbitrary apparatus on the public network 200 and a unique address only under the control of the address conversion device. The address conversion device 203 is assigned a plurality of addresses by the service provider terminal 201, and transfers them to the address distribution device 204 to cause it to manage these addresses. The address distribution device 204 distributes an address to the user terminal 205. The address distribution device 204 holds an arbitrary number of IDs and an arbitrary number of addresses acquired by the device 204 itself. The address distribution device 204 selects an arbitrary one of unused addresses in accordance with a request from the user terminal 205, and notifies the user terminal 205 of the selected address. When the user terminal 205 requests connection to the public network 200 by using an ID issued by the ID issuing terminal 206, the address distribution device 204 permits connection to the public network 200 via the service provider terminal 201 connected to the access line 207 within only an arbitrary time. The user terminal 205 is used upon connection to the public network 200, and stores a sequence for receiving address distribution from the address distribution device 204. The ID issuing terminal 206 issues an ID to the user terminal 205, and stores a plurality of IDs each formed by a character string of an arbitrary number of characters. The ID issuing terminal 206 has a function of exchanging information on an unused ID and issued ID between the ID issuing terminal 206 and the address distribution device 204.

Figure 2:
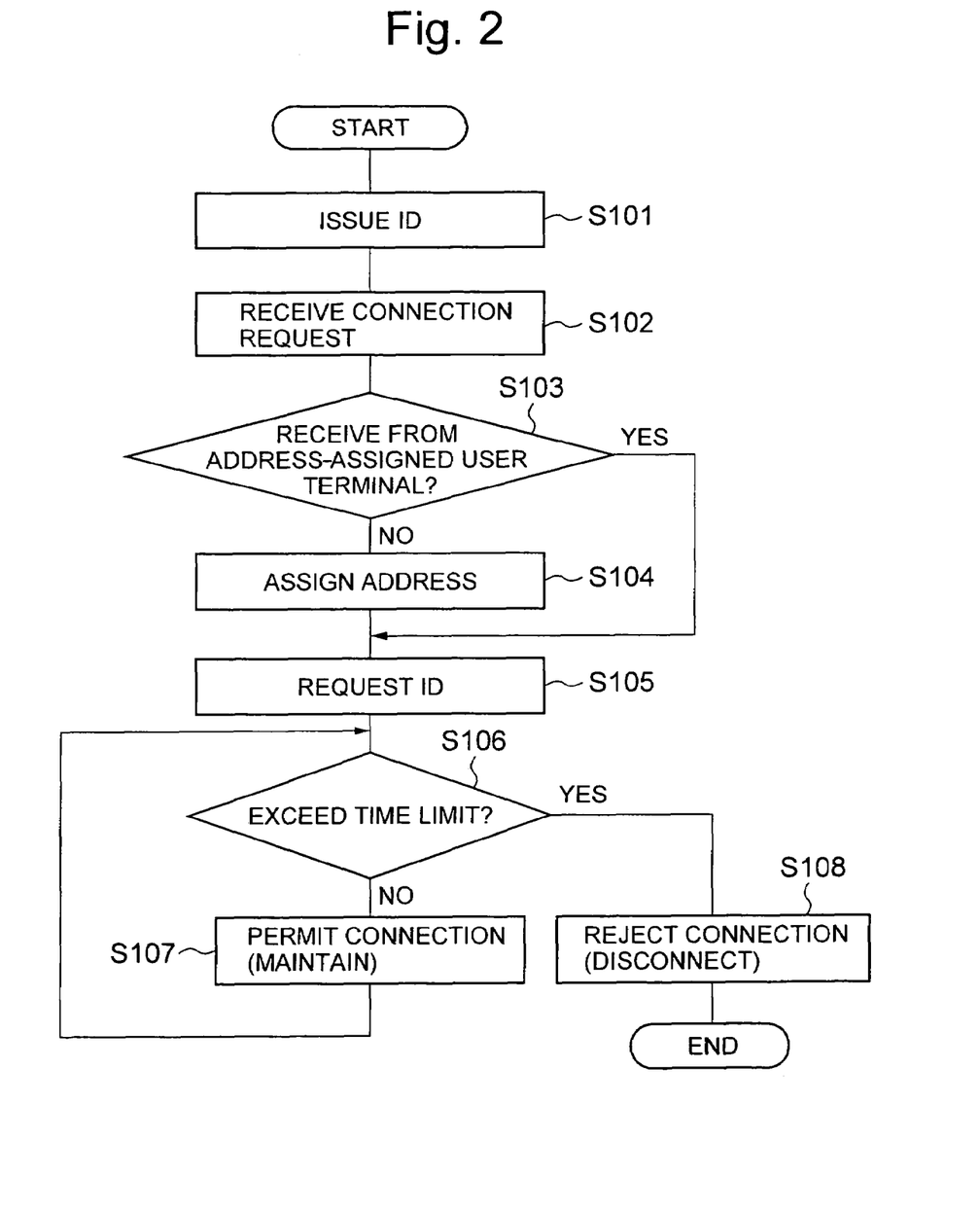
FIG. 2 is an operation flowchart of the access control apparatus according to the first embodiment.

The operation of the access control apparatus according to the first embodiment will be explained. FIG. 2 shows the operation flowchart of the access control apparatus.

The ID issuing terminal 206 issues an unused one of IDs stored in the terminal 206 to the user of the user terminal 205 in accordance with a request from the user terminal 205. The ID issuing terminal 206 notifies the address distribution device 204 which ID has been issued to the user terminal 205.

When the address distribution device 204 receives a connection request to the public network 200 from the user terminal 205 (step S102), the device 204 determines whether an address has already been assigned to the user terminal 205 serving as the connection request transmission source (step S103). If no address is assigned to the user terminal 205 (NO in step S103), the address distribution device 204 assigns a new unused address of those held by the device 204 to the user terminal 205 (step S104).

If an address has already been assigned to the user terminal 205 (YES in step S103) or a new address is assigned (step S104), the address distribution device 204 requests the user terminal 205 to transmit a user ID (step S105).

When the address distribution device 204 receives a user ID from the user terminal 205, the device 204 stores information that the ID is in use, and determines whether the use time of the address assigned to the user terminal 205 has exceeded the time limit (step S106). If the address use time does not exceed the time limit (NO in step S106), the address distribution device 204 permits the user terminal 205 to connect the public network 200 (step S107). If the address use time has exceeded the time limit (YES in step S106), the address distribution device 204 rejects connection of the user terminal 205 to the public network (step S108).

While the user terminal 205 is connected to the public network 200, the address distribution device 204 keeps monitoring the use time of the address assigned to the user terminal 205 (NO in step S106 and S107). If the address use time exceeds the time limit (YES in step S106 and S108), the address distribution device 204 rejects connection of the user terminal 205 to the public network 200.

Figure 3:
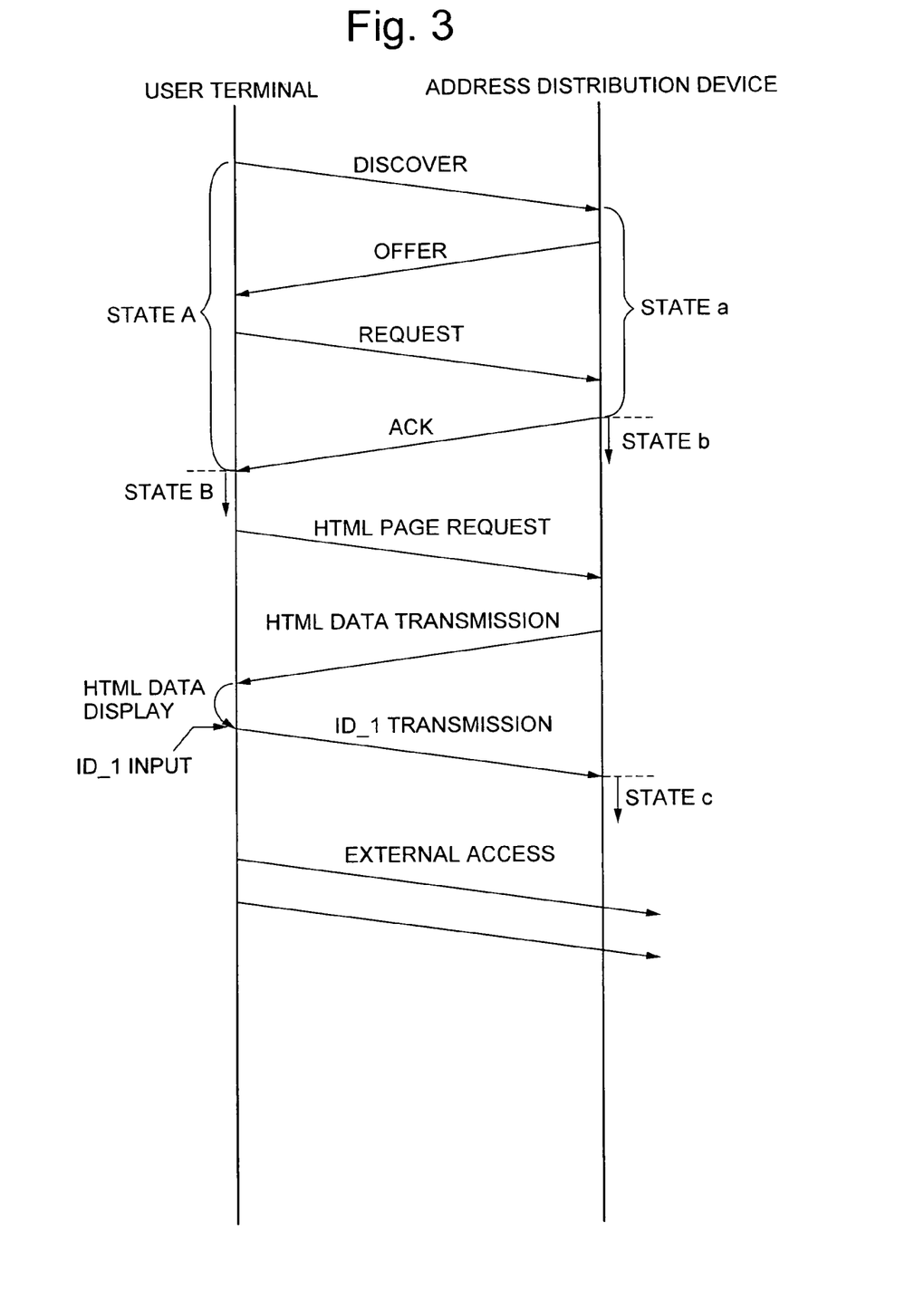
FIG. 3 is a view showing an example of the operation sequence of the access control apparatus according to the first embodiment.
Figure 4A:
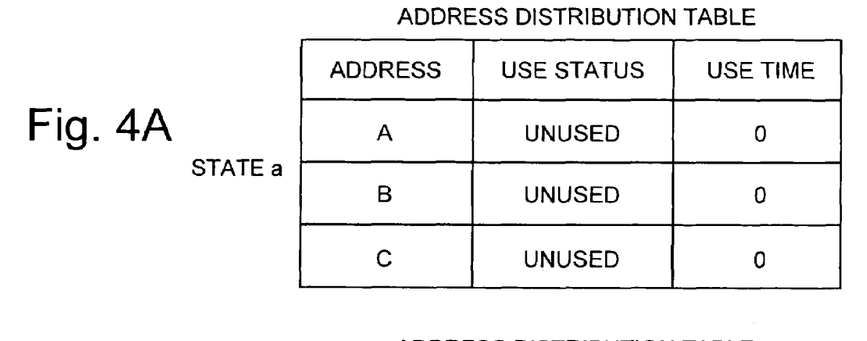
FIGS. 4A to 4C are tables, respectively, showing the states of an address distribution device in the operation sequence of the access control apparatus according to the first embodiment.
Figure 4B:
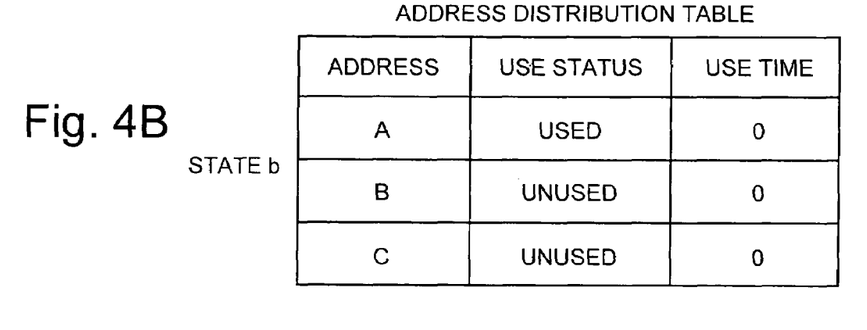
Figure 4C:
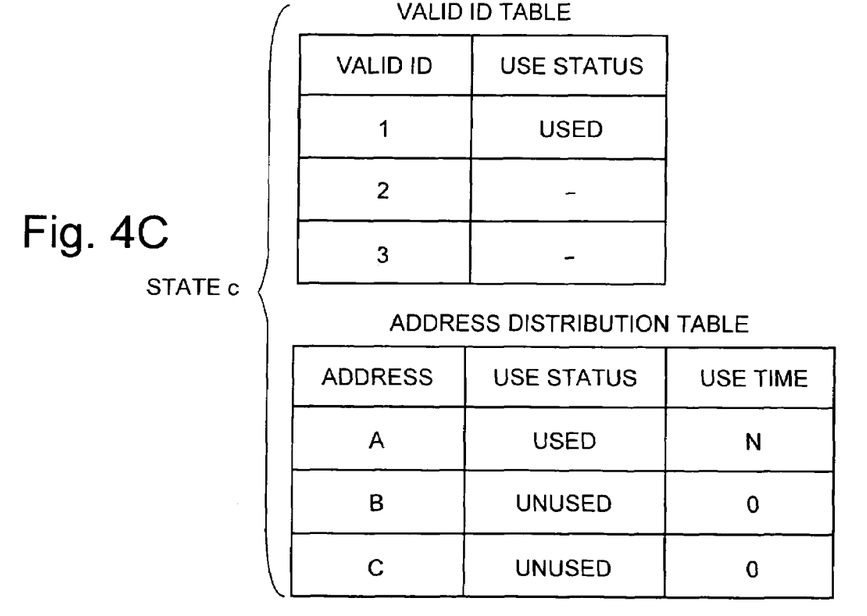

FIG. 3 shows an example of the operation sequence of the access control apparatus according to the first embodiment. The operation sequence represents process procedures between the address distribution device 204 and the user terminal 205.

FIGS. 4A to 4C, 5A, and 5B show the states of the address distribution device 204 and user terminal 205 during operation. The user terminal 205 acquires an unused ID (ID_1) from the ID issuing terminal 206 prior to reception of connection permission to the public network 200. The ID issuing terminal 206 notifies the address distribution device 204 of ID_1 issued to the user terminal 205. In other words, the ID issuing terminal 206 notifies the address distribution device 204 of information representing which ID has been issued to the user terminal 205. At the start of operation, the user terminal 205 is set in a state "A" (see FIG. 5A), and the address distribution device 204 is set in a state "a" (see FIG. 4A).

In connecting the user terminal 205 to the public network 200, the user terminal 205 starts a sequence of receiving address distribution between the user terminal 205 and the address distribution device 204 on the basis of a sequence stored in advance.

The user terminal 205 sends a signal "DISCOVER request" for confirming the presence of the address distribution device 204 to the address distribution device 204. The address distribution device 204 which has received the signal sends a signal "OFFER response" representing the presence of the device 204 to the user terminal 205.

The user terminal 205 which has received the response sends a signal "REQUEST" which requests address distribution to the address distribution device 204. The address distribution device 204 which has received the signal selects an unused address from an address distribution table held by the device 204, and assigns the address to the user terminal 205. In this case, address A is assigned. After the address distribution device 204 assigns the address to the user terminal 205, the state of the device 204 changes to "b" (see FIG. 4B).

Figure 5A:
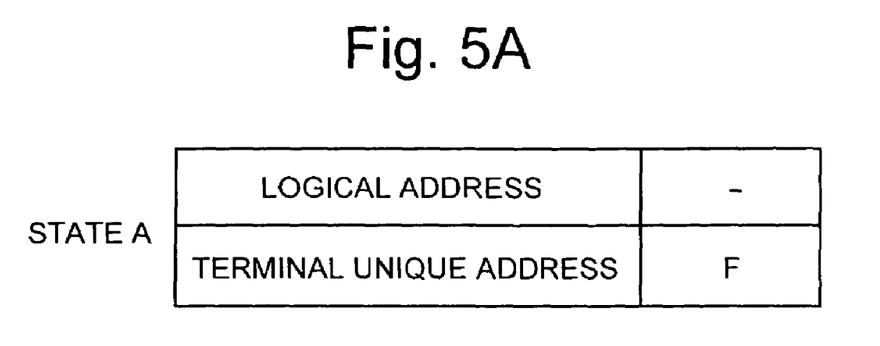
FIGS. 5A and 5B are tables, respectively, showing the states of a user terminal in the operation sequence of the access control apparatus according to the first embodiment.
Figure 5B:
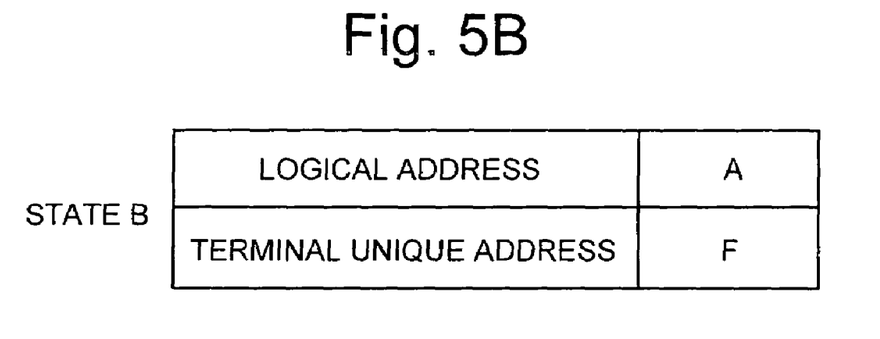

After the user terminal 205 is assigned the address, the state of the user terminal 205 changes to "B" (see FIG. 5B). The address-assigned user terminal 205 requests the address distribution device 204 to transmit ID input window data (e.g., HTML Web page). In response to the request, the address distribution device 204 transmits the ID input window data to the user terminal 205.

Upon reception of the ID input window data from the address distribution device 204, the user terminal 205 displays the ID input window and prompts the user to input an ID. If the user inputs his ID (ID_1) to the user terminal 205, the user terminal 205 transmits the acquired ID to the address distribution device 204.

The address distribution device 204 which has received the ID transmitted from the user terminal 205 stores, in a valid ID table, information representing that the ID (ID_1) is in use, and stores an arbitrary value "N" as a use time corresponding to address A in the address distribution table. As a result, the state of the address distribution device 204 changes to "c" (see FIG. 4C)

The user terminal 205 is permitted to be connected to the public network 200 till the lapse of the use time which is stored in the address distribution table in the address distribution device 204 and corresponds to address A.

The address distribution device 204 periodically updates the use time corresponding to address A, and measures a time elapsed after the user terminal 205 acquires the ID. When an arbitrarily set time (N) has elapsed, the address distribution device 204 rejects connection to the public network 200 using address A.

In this manner, the access control apparatus according to the first embodiment assigns an address for which a time limit is set, to the user terminal of a user who requests connection to a public network. This essentially means that a time-limit ID is issued to the user and only while the ID is valid, connection of the user terminal to a public network is permitted. Connection of unspecified users to a public network via terminals can, therefore, be temporarily limited. Since a specific user cannot keep connecting his terminal to a public network, another user who has waited for connection can connect his terminal to the public network.

Since a user is limited by issuing a simple ID to him, the user can be easily managed and easily connect his terminal to a public network.

Second Embodiment

Figure 6:
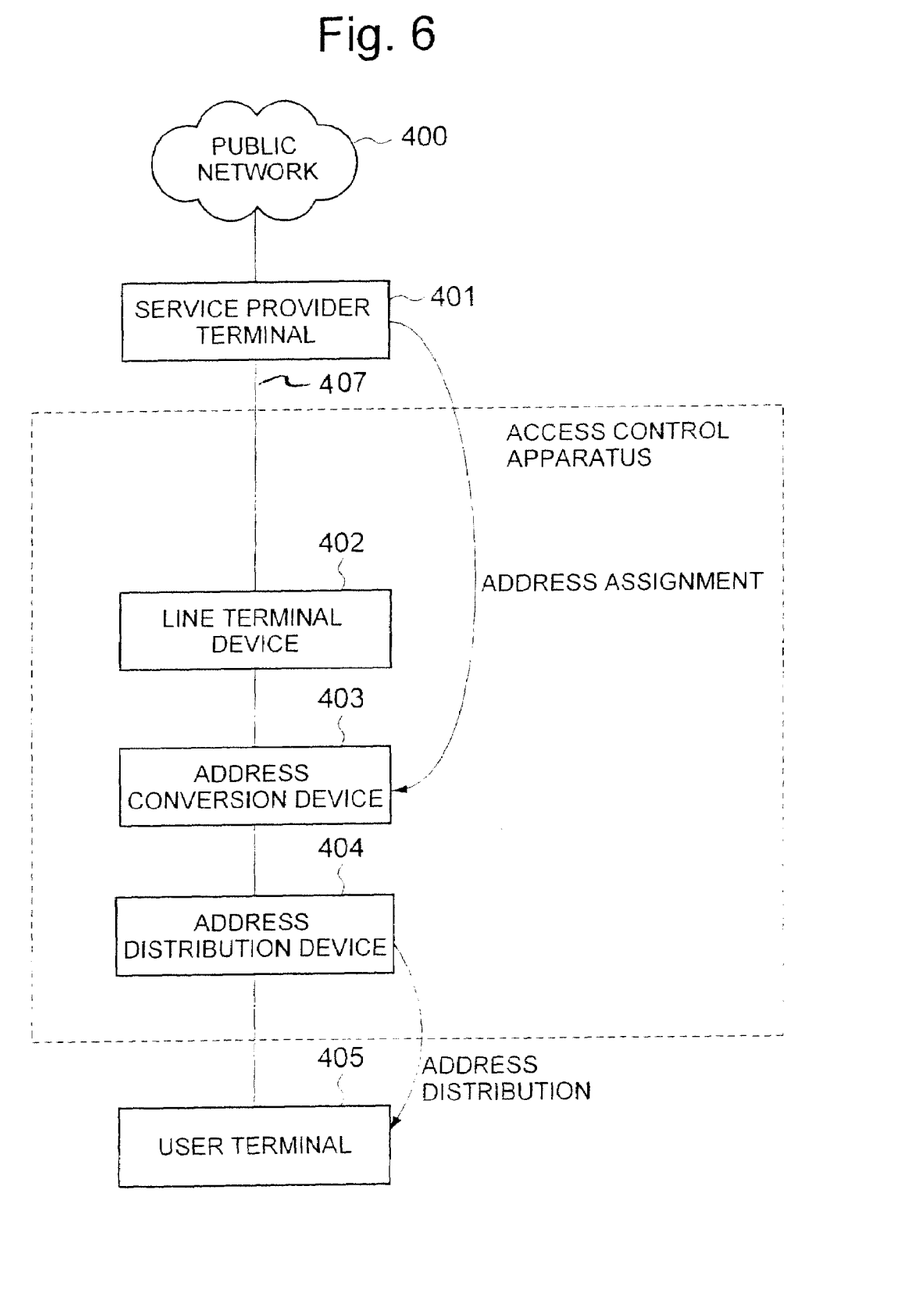
FIG. 6 is a view showing the arrangement of an access control apparatus according to the second embodiment which preferably practices the present invention.

The second embodiment which preferably practices the present invention will be explained with reference to FIGS. 6 to 9B. FIG. 6 shows an access control apparatus according to the second embodiment. The access control apparatus comprises a line terminal device 402, address conversion device 403, address distribution device 404, and access line 407. A service provider terminal 401 and user terminal 405 are connected via the access control apparatus. That is, the access control apparatus according to the second embodiment is the same as that according to the first embodiment except that no ID issuing terminal 206 is adopted.

Figure 7:
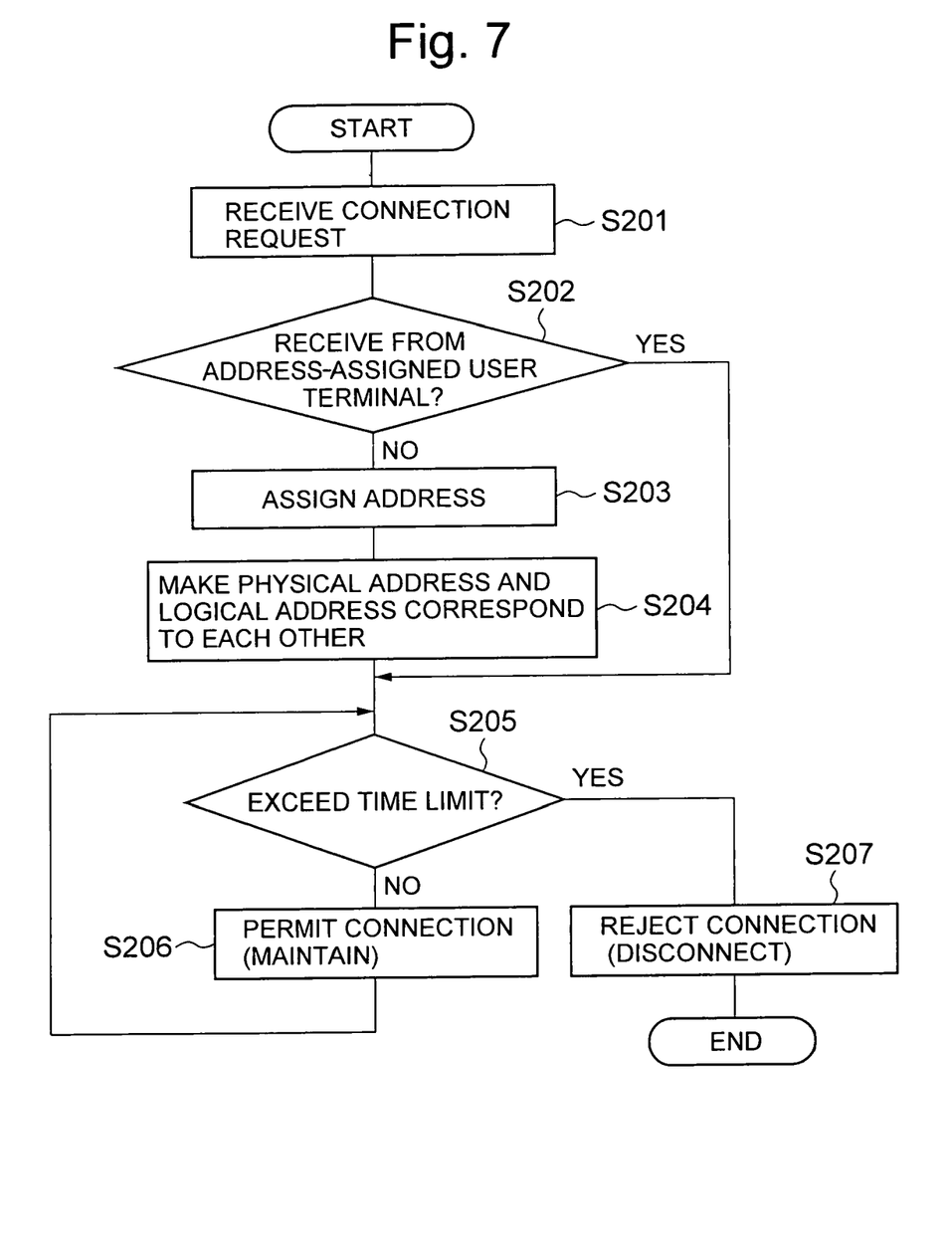
FIG. 7 is an operation flowchart of the access control apparatus according to the second embodiment.

The operation of the access control apparatus according to the second embodiment will be explained. FIG. 7 shows the operation flowchart of the access control apparatus according to the second embodiment.

When the address distribution device 404 receives a connection request to a public network 400 from the user terminal 405 (step S201), the device 404 determines whether an address has already been assigned to the user terminal 405 serving as the connection request transmission source (step S202). If no address is assigned to the user terminal 405 (NO in step S202), the address distribution device 404 assigns a new unused address of those held by the device 404 to the user terminal 405 (step S203).

If an address has already been assigned to the user terminal 405 (YES in step S202) or a new address is assigned (step S203), the address distribution device 404 stores a logical address assigned to the user terminal 405 and the terminal unique address (physical address) of the user terminal 405 in correspondence with each other (step S204). Further, the address distribution device 404 determines whether the use time of the address assigned to the user terminal 405 has exceeded the time limit (step S205). If the address use time does not exceed the time limit (NO in step S205), the address distribution device 404 permits the user terminal 405 to connect the public network 400 (step S206). If the address use time has exceeded the time limit (YES in step S205), the address distribution device 404 rejects connection of the user terminal 405 to the public network (step S207).

While the user terminal 405 is connected to the public network 400, the address distribution device 404 keeps monitoring the use time of the address assigned to the user terminal 405 (NO in step S205 and S206). If the address use time exceeds the time limit (YES in step S205 and S207), the address distribution device 404 rejects connection of the user terminal 405 to the public network 400.

Figure 8:
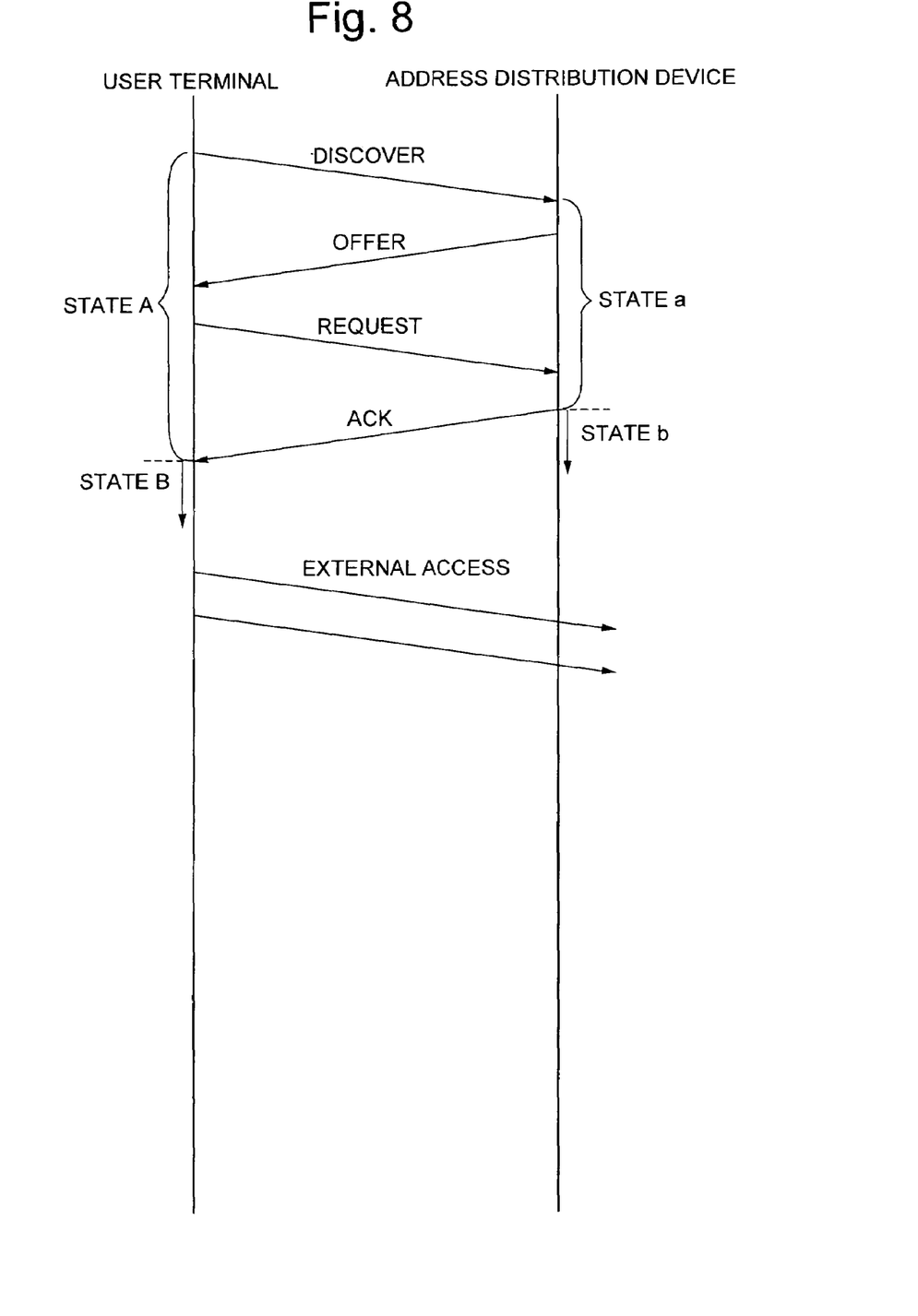
FIG. 8 is a view showing an example of the operation sequence of the access control apparatus according to the second embodiment.

FIG. 8 shows an example of the operation sequence of the address distribution device according to the second embodiment. In the second embodiment, the user terminal 405 does not receive any ID issuing prior to connection to the public network 400.

Figure 9A:
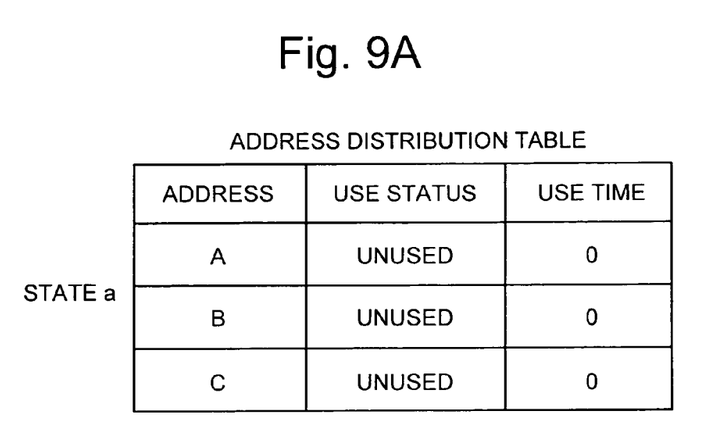
FIGS. 9A and 9B are tables, respectively, showing the states of an address distribution device in the operation sequence of the access control apparatus according to the second embodiment.
Figure 9B:
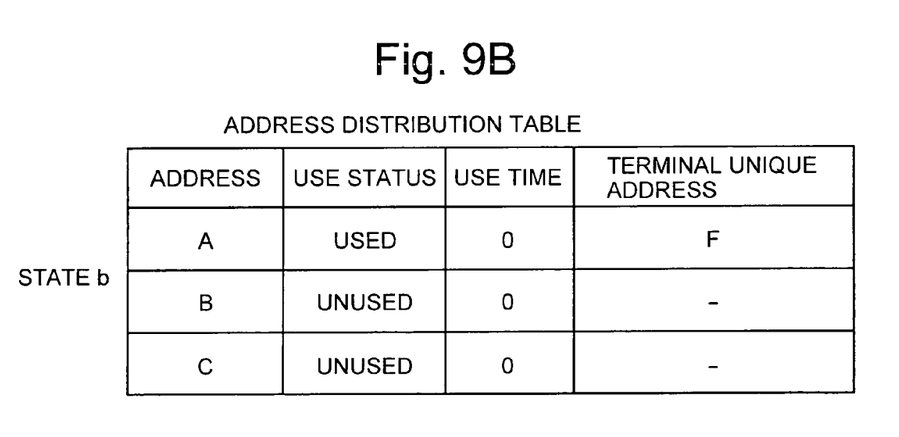

FIGS. 9A and 9B show the state of the address distribution device 404 during operation. The state of the user terminal 405 during operation is the same as that in the first embodiment (see FIGS. 5A and 5B). At the start of operation, the user terminal 405 is set in a state "A" (see FIG. 5A), and the address distribution device 404 is set in a state "a" (see FIG. 9A).

In connecting the user terminal 405 to the public network 400, the user terminal 405 starts a sequence of receiving address distribution between the user terminal 405 and the address distribution device 404 on the basis of a sequence stored in advance. The user terminal 405 sends a signal "DISCOVER request" for confirming the presence of the address distribution device 404 to the address distribution device 404. The address distribution device 404 which has received the signal sends a signal "OFFER response" representing the presence of the device 404 to the user terminal 405.

The user terminal 405 which has received the response sends a signal "REQUEST" which requests address distribution to the address distribution device 404. The address distribution device 404 which has received the signal selects an unused address from an address distribution table held by the device 404, and assigns the address to the user terminal 405. In this case, address A is assigned.

The address distribution device 404 makes terminal-unique address F of the user terminal 405 and an arbitrary use time N correspond to the address (A) assigned to the user terminal 405. After the address distribution device 404 assigns the address to the user terminal 405 and makes it correspond to the terminal-unique address, the state of the device 404 changes to "b" (see FIG. 9B). The state of the address-assigned user terminal 405 changes to "B" (see FIG. 5B).

The address distribution device 404 permits the address A-assigned user terminal 405 to connect a public network. Upon the lapse of the use time N corresponding to the address table, the address distribution device 404 rejects connection to the public network 400 using address As described above, the access control apparatus according to the second embodiment issues a time-limit address to the user, and manages which address has been assigned to the user terminal. Connection of unspecified users to a public network via terminals can be temporarily limited. Since a specific user cannot keep connecting his terminal to a public network, another user who has waited for connection can connect his terminal to the public network.

The above embodiments are preferred ones of the present invention, and the present invention is not limited to them.

For example, in the above embodiments, the address distribution device manages an address distributed to the user terminal by using the address distribution table. However, address management is not limited to this.

In the access control apparatus, a single device may comprise all functions, or a plurality of devices may share function.

In this manner, the present invention can be variously modified.

What is claimed is:

1. An access control apparatus which controls connection to a public network via a service provider terminal from a plurality of user terminals manipulated by unspecified users, comprising:

means for holding a predetermined number of addresses provided in advance by the service provider terminal and converting two addresses into each other: an address capable of specifying an arbitrary apparatus on the public network and a unique address under control of said means for holding a predetermined number of addresses;

means for issuing IDs for specifying users of the user terminals;

means receiving addresses, assigned by the service provider terminal, transferred by the means for holding a predetermined number of addresses for managing these addresses;

means for, upon reception of a connection request from one of the user terminals, determining whether a logical address has already been assigned to the requesting user terminal;

means for assigning a logical address for which a time limit is set, to a user terminal not assigned any logical address;

means for, in response to a connection request from the user terminal assigned the logical address, requesting the user terminal serving as a transmission source of the connection request to transmit the ID;

means for determining, on the basis of the ID acquired from the user terminal serving as the transmission source of the connection request, a user and a used user terminal by which the connection request to the public network has been transmitted;

means for connecting the user terminal to the public network when a use time of the logical address assigned to the user terminal serving as the transmission source of the connection request falls within the time limit set for the logical address; and means for disconnecting the user terminal from the public network when the use time of the logical address assigned to the user terminal connected to the public network reaches the time limit set for the logical address.

2. An apparatus according to claim 1, wherein the ID issued to a user of the user terminal and the address assigned to the user terminal are managed in separate tables, and the user and the used user terminal by which the connection request to the public network has been transmitted are determined on the basis of the ID acquired from the user terminal serving as the transmission source of the connection request and the address assigned to the user terminal.

3. An access control apparatus which controls connection to a public network via a service provider terminal from a plurality of user terminals manipulated by unspecified users, comprising:

means for holding a predetermined number of addresses provided in advance by the service provider terminal;

means receiving addresses, assigned by the service provider terminal, transferred by the means for holding predetermined number of addresses for managing these addresses;

means for, upon reception of a connection request from one of the user terminals, determining whether a logical address has already been assigned to the requesting user terminal;

means for assigning a logical address for which a time limit is set, to a user terminal not assigned any logical address;

means for acquiring a physical address from the user terminal assigned the logical address;

means for associating the logical address of the user terminal serving as a transmission source of the connection request with information representing use times of the physical address and the logical address of the user terminal;

means for connecting the user terminal to the public network when the use time of the logical address assigned to the user terminal serving as the transmission source of the connection request falls within the time limit set for the logical address; and means for disconnecting the user terminal from the public network when the use time of the logical address assigned to the user terminal connected to the public network reaches the time limit set for the logical address.

4. An apparatus according to claim 3, wherein the logical address assigned to the user terminal serving as the transmission source of the connection request and the physical address of the user terminal are managed in the same table.

5. An access control method of controlling connection to a public network via a service provider terminal from a plurality of user terminals manipulated by unspecified users, comprising the steps of:

holding a predetermined number of addresses provided in advance by the service provider terminal and converting two addresses into each other: an address capable of specifying an arbitrary apparatus on the public network and a unique address;

issuing IDs for specifying users to users of the user terminals;

receiving addresses, assigned by the service provider terminal, and managing these addresses;

determining, upon reception of a connection request from one of the user terminals, whether a logical address has already been assigned to the requesting user terminal;

assigning a logical address for which a time limit is set, to a user terminal not assigned any logical address;

requesting, in response to a connection request from the user terminal assigned the logical address, the user terminal serving as a transmission source of the connection request to transmit the ID;

determining, on the basis of the ID acquired from the user terminal serving as the transmission source of the connection request, a user and a used user terminal by which the connection request to the public network has been transmitted;

connecting the user terminal to the public network when a use time of the logical address assigned to the user terminal serving as the transmission source of the connection request falls within the time limit set for the logical address; and disconnecting the user terminal from the public network when the use time of the logical address assigned to the user terminal connected to the public network reaches the time limit set for the logical address.

6. An access control method of controlling connection to a public network via a service provider terminal from a plurality of user terminals manipulated by unspecified users, comprising the steps of:

holding a predetermined number of addresses provided in advance by the service provider terminal;

receiving addresses, assigned by the service provider terminal, and managing these addresses;

determining, upon reception of a connection request from one of the user terminals, whether a logical address has already been assigned to the requesting user terminal;

assigning a logical address for which a time limit is set, to a user terminal not assigned any logical address;

acquiring a physical address from the user terminal assigned the logical address;

associating the logical address of the user terminal serving as a transmission source of the connection request with information representing use times of the physical address and the logical address of the user terminal;

connecting the user terminal to the public network when the use time of the logical address assigned to the user terminal serving as the transmission source of the connection request falls within the time limit set for the logical address; and disconnecting the user terminal from the public network when the use time of the logical address assigned to the user terminal connected to the public network reaches the time limit set for the logical address.

* * * * *